US005844470A

United States Patent [19]

Garnault et al.

[11] Patent Number: 5,844,470

[45] Date of Patent: Dec. 1, 1998

[54] DEVICE FOR CONTROLLING OPENING OF A MOTOR VEHICLE DOOR

[75] Inventors: Joël Garnault, Sannois; Haja Rabeony, Vincennes; Jean-Claude Boulay, Creteil, all of France

[73] Assignee: Valeo Securite Habitacle, Creteil, France

[21] Appl. No.: 881,215

[22] Filed: Jun. 24, 1997

[30] Foreign Application Priority Data

Jun. 25, 1996 [FR] France .................................. 96 07889

[51] Int. Cl.[6] ........................................ B60R 25/10

[52] U.S. Cl. .................... 340/426; 340/542; 340/825.69; 340/825.31; 307/10.2; 180/287; 70/149; 70/218; 70/264; 70/278; 70/467; 292/201; 292/DIG. 27

[58] Field of Search .............................. 340/426, 825.69, 340/825.31, 542, 543, 825.5, 425.5; 307/10.2–10.6; 180/287; 70/257, 264, 277, 278, 262, 263, 467, 149, 218; 292/216, 201, DIG. 23, DIG. 27

[56] References Cited

U.S. PATENT DOCUMENTS

| | | | |
|---|---|---|---|
| 4,183,177 | 1/1980 | Kurdziel | 49/276 |
| 4,425,597 | 1/1984 | Schramm | 307/10.2 |
| 4,591,854 | 5/1986 | Robinson | 340/825.31 |
| 4,738,334 | 4/1988 | Weishaupt . | |
| 4,811,013 | 3/1989 | Akutsu | 340/825.31 |
| 4,931,789 | 6/1990 | Pinnow | 340/825.56 |
| 4,983,947 | 1/1991 | Mullen et al. | 340/426 |
| 5,111,199 | 5/1992 | Tomoda et al. | 340/825.72 |
| 5,263,347 | 11/1993 | Allbaugh et al. | 70/257 |
| 5,613,716 | 3/1997 | Cafferty | 292/216 |
| 5,682,135 | 10/1997 | Labonde | 340/426 |
| 5,699,685 | 12/1997 | Jahrsetz et al. | 180/287 |

FOREIGN PATENT DOCUMENTS

| | | |
|---|---|---|
| 0 218 251 | 4/1987 | European Pat. Off. . |
| 0 430 732 | 6/1991 | European Pat. Off. . |
| 0 587 465 | 3/1994 | European Pat. Off. . |
| 2 674 895 | 10/1992 | France . |

OTHER PUBLICATIONS

French Search Report dated 28 Feb. 1997.

*Primary Examiner*—Nina Tong
*Attorney, Agent, or Firm*—Morgan & Finnegan, L.L.P.

[57] ABSTRACT

Opening of a motor vehicle door, having a door lock, is controlled by a system which includes: a door handle pivoted on the door for displacement between a rest position and an open position and connected to the door lock through a linkage; an intermediate lever which is pivoted about a pivot axis on the door and which is connected to the linkage; and a motorized mechanism interposed between the door handle and the intermediate lever. The motorized mechanism is arranged to assume, selectively, an inhibiting state in which manipulation of the door handle has no effect on the intermediate lever, and an operational state in which manipulation of the handle causes simultaneous displacement of the intermediate lever. When this mechanism is actuated to shift it from its inhibiting state to its operational state, the intermediate lever is displaced until the door lock is unlocked.

17 Claims, 6 Drawing Sheets

DEVICE FOR CONTROLLING OPENING OF A MOTOR VEHICLE DOOR

FIELD OF THE INVENTION

This invention relates in general terms to devices for controlling opening of an openable part of a motor vehicle. An openable part is to be understood to mean any element of the vehicle that requires to be opened in order to gain access to some part of the interior of the vehicle, such as doors, tailgates, hoods or bonnets, or boot or trunk covers. For convenience, such an openable part will be simply referred to as a door in this Application. Thus the invention is particularly concerned with devices for controlling the opening of a lockable door of a motor vehicle, and more particularly for controlling the unlocking of a motor vehicle door lock.

The invention is especially applicable in the case of a vehicle with central locking, in which an electronic central unit generates orders for locking and unlocking the locks on the doors of the vehicle, the central unit being adapted to receive orders to lock or unlock the various doors from a module carried by an authorised user of the vehicle, the module normally being a remote control device coded to issue a signal identifying the authorised user.

BACKGROUND OF THE INVENTION

Such an identification module typically also includes a fixed antenna carried by the vehicle, which exchanges signals with an emitter carried by the authorised user. This emitter comprises, for example, a passive responder, that is to say a responder which does not have its own current source, and which, in response to an excitation signal emitted by the antenna, automatically transmits an identification signal which comprises, in particular, an identification code.

The function of the electronic central unit is to recognise the code received, and if the latter corresponds to the code of an authorised user, to cause, in response to that code, the centralised unlocking of the various locks with which the various doors of the vehicle are equipped.

When the locks have been unlocked, the user can then freely open any one or more of the doors, by operating in the usual way a manoeuvring handle for releasing the corresponding lock. In this context, in this Application a manoeuvring handle means a door handle of any type, such as the lifting flap type which comprises a pivoting plate which is lifted by the user, or a handle in the form of a lever which is pushed down to open the door; or again, a spring loaded push button. All such devices will be referred to herein for convenience as door handles. Thus, once the door lock has been unlocked, the user can, in general terms, operate the door handle so as to open the door.

Where the emitter consisting of the transponder is a passive emitter which is activated automatically by the antenna, the latter will be carried by the user, being for example worn on his wrist or carried in an accessory attached to his clothing. The effective distance of radio signal exchange between the antenna and the transponder is only a few tens of centimetres in this case. It is therefore only when, for example, the hand of the user approaches the antenna carried by the vehicle that the identification module becomes able to operate.

The antenna does not of course emit permanently, and the user has to cause it to be activated by a voluntary action, for example a mechanical action by operating a switch.

Optimisation of ergonomic considerations in connection with such a door-opening system requires, in order to simplify the various operations, that the antenna should be activated when the user manoeuvres the door handle by which he will soon afterwards unlock the lock and open the door. In this connection, it is normal for a person to manipulate a vehicle door handle very quickly, i.e. the handle is moved at a very high velocity, and the reaction time of the system as a whole, and in particular the reaction time of the identification means followed by that of the centralised unlocking of the locks, is too long. It can therefore happen that the user has fully manipulated the door handle without having been able to initiate the unlocking per se of the associated door lock.

DISCUSSION OF THE INVENTION

An object of the invention is to propose a control device for the opening of a vehicle door (as defined above) which enables opening or unlocking of the door lock to be achieved when the manipulation or actuation of a door handle (as defined above) by an authorised user, however rapid, has already been accomplished. A further object is to achieve this in a manner which is obvious to the user, without however enabling a command for opening of a door lock to be given if the door handle was not actuated by an authorised user.

The device according to the invention must of course also enable a command for opening of the door lock by the authorised user to be achieved if the user manipulates the door handle twice in succession, that is to say with a first manipulation which leads to unlocking of the lock, followed by a second manipulation which enables the lock, already unlocked, to be opened.

To this end, the invention proposes a control device for the opening of a motor vehicle door (as defined above), of the type comprising a door handle (as defined above) which is articulated on the door about a fixed axis, for movement of the handle between a first end position, or rest position, and a second end position corresponding to unlocking of the lock and opening of the door, the door handle being connected to the door lock through a linkage, characterised in that an intermediate lever is mounted for pivoting displacement about a fixed pivot axis, the said linkage being coupled to the intermediate lever, this lever being coupled to the door handle by a controllable motorised mechanism being interposed between the door handle and the intermediate lever, the intermediate lever being adapted to be in a first state, namely an inhibiting state, in which manipulation of the door handle is ineffective on the intermediate lever, and a second state, or operational state, in which manipulation of the door handle causes simultaneous displacement of the intermediate lever to take place, with the said motorised mechanism, when actuated to cause the intermediate lever to pass from its inhibiting state to its operational state, causing the intermediate lever to be displaced until the lock is unlocked.

The intermediate lever is preferably mounted for pivoting displacement about the axis of articulation of the door handle.

According to a preferred feature of the invention, the said mechanism includes a control bar which is mounted for linear sliding displacement with respect to the intermediate lever, in a direction substantially at right angles to the orientation of the control bar and generally radial with respect to the said pivot axis (or axis of articulation), the control bar cooperating with a control profile formed in the door handle, the said mechanism including a motorised member that controls the displacements of the control bar.

Preferably, the door handle is formed with a control aperture which lies in a plane at right angles to the said pivot axis, with a portion of the control bar extending through the said control aperture, part of the internal contour of the control aperture constituting the said control profile.

The control profile preferably comprises a substantially straight, radially oriented portion, together with a curved portion joined to the said straight portion through a circular junction portion centred on the said pivot axis.

The control mechanism preferably further includes a control cam, the control bar being biassed in a linear direction (i.e. in translation) for permanent cooperation with the profile of the said control cam.

The control cam is preferably mounted for rotation about the said pivot axis of the door handle, being arranged to be driven in rotation, independently of the door handle, by a control motor so as to constitute, with the latter, the said motorised member.

In some embodiments of the invention, the control cam being fixed, the said motorised member is a linear actuator carried by the intermediate lever which acts directly on the control bar.

The profile of the cam may have a portion of increasing radius which urges the control bar in linear motion, in the direction corresponding to the manoeuvre when the mechanism passes from its inhibited state to its operational state.

The said portion, of increasing radius, of the cam profile, is preferably extended from its point of greatest radius by another portion having a constant radius, which traverses the control bar when the door handle reverts from its second (fully open) position to its first (rest) position.

The device preferably includes means for blocking rotation of the intermediate lever when the motorised mechanism is in its inhibited state. The said blocking means preferably comprise means for blocking the motorised member.

The door handle is preferably returned resiliently to its rest position when released by the user.

According to a further preferred feature of the invention, the device includes an electronic central unit for generating orders for locking and unlocking of the door locks of the vehicle, the said central unit being adapted to control the said motorised mechanism and including a module for identification of an authorised user of the vehicle, associated with an antenna for exchanging signals with a transponder carried by the authorised user of the vehicle, the transponder being adapted to emit an identification signal automatically in response to an excitation signal emitted by the antenna.

The antenna of the identification module is preferably incorporated in the door handle.

According to yet another preferred feature of the invention, the identification module further includes a switch controlled by the door handle and adapted to cause the antenna to be activated when the door handle leaves its rest position.

The central unit preferably includes at least one manually operable switch for controlling locking of the locks.

Further features and advantages of the invention will appear more clearly on a reading of the following detailed description of some preferred embodiments of the invention, given by way of non-limiting example only and with reference to the accompanying drawings.

DESCRIPTION OF PREFERRED EMBODIMENTS OF THE INVENTION

Figure 1:
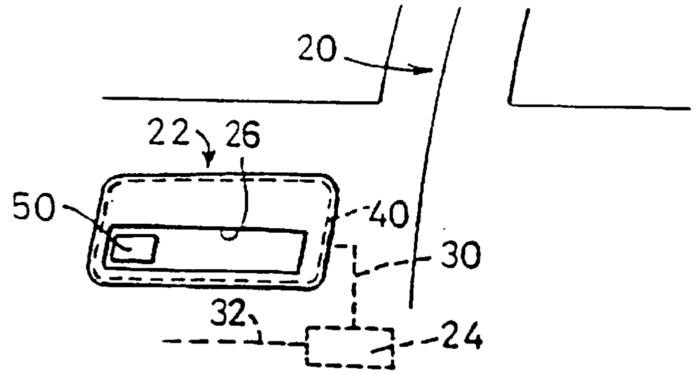
FIG. 1 is a diagrammatic view showing a motor vehicle door, having a door handle which is associated with a device for controlling the opening of the door in accordance with the invention.

In this description, those components or elements which are identical or similar to each other are indicated by the same reference numerals.

Figure 2:
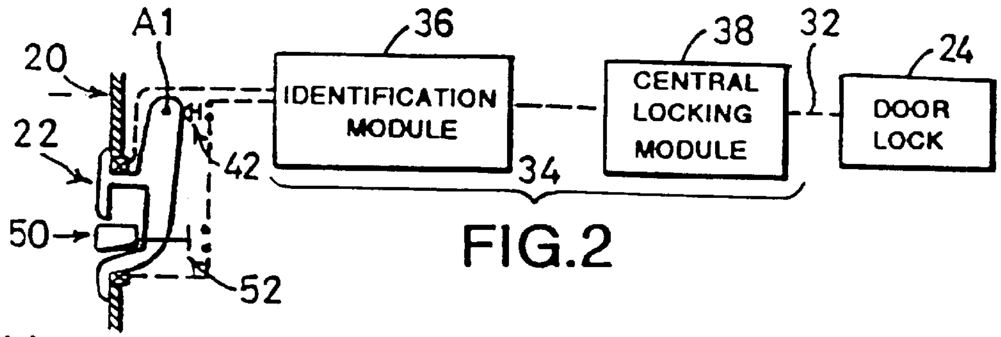
FIG. 2 is a cross section through the door handle, combined with a block diagram of the central electronic unit associated with the door handle of FIG. 1.
Figure 3:
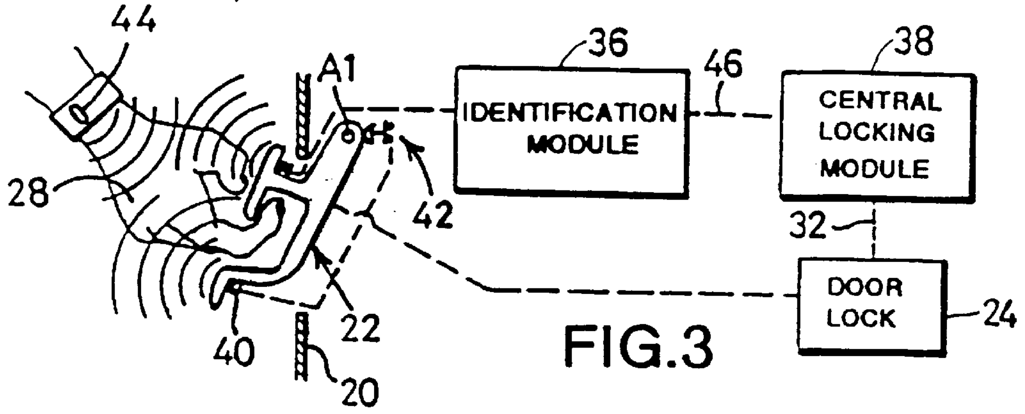
FIG. 3 is similar to FIG. 2, showing one phase in the control of opening of the door.
Figure 4:
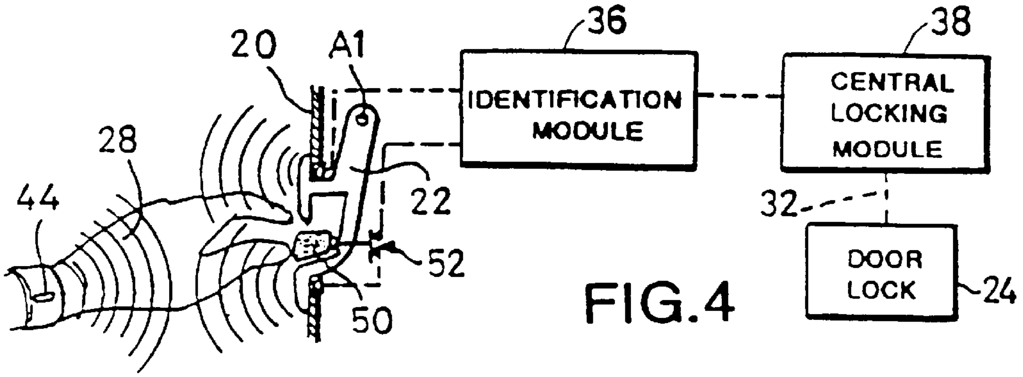
FIG. 4 is similar to FIG. 3 but shows another phase in the control of opening the door.

Reference is first made to FIGS. 1 to 4. FIG. 1 shows a motor vehicle door 20 which is equipped with a door handle 22 for opening and closing the door and for the mechanical control of the opening of the door lock 24, which is indicated diagrammatically in broken lines in FIG. 1. In this example, the door handle 22 is of the pallet, or lifting plate, type, and is articulated with respect to the door 20 about a geometric pivot axis A1, between a first end position, which is a rest position in which the handle is shown in FIGS. 1, 2 and 4, and a second end position, or opening position, corresponding to unlocking of the door lock 24 and opening the door. This latter position is shown in particular in FIG. 3.

The body of the lifting plate of the door handle 22 has a central recess 26 for enabling a user to grip the plate with his hand 28.

FIG. 1 shows diagrammatically the mechanical connections whereby the door handle 22 is connected to the door lock 24, in a manner which will be explained in detail later in this description. Also shown in FIG. 1 is a broken line 32 indicating the connection between the door lock mechanism 24 and a central electronic unit 34 for controlling locking and unlocking of the various locks with which the vehicle is equipped.

The central control unit 34 comprises a module 36 for identifying an authorised user, together with a unit 34 for central locking and unlocking of the various locks. An antenna 40 of generally known design is incorporated in the door lock 22. The antenna 40 is connected to the identification module 36 through a switch 42.

The switch 42 is open when the door handle 22 is in its first or rest position, and it is closed when the door handle 22 leaves its rest position when being pulled towards its second, or fully open, position. When the switch 42 is closed, and as can be seen in FIG. 3, the antenna 40 is activated by the identification module 36. The antenna is then ready to exchange radio signals with an emitter 44, in the form of a passive responder which is for example worn on the wrist of a user who is authorised to gain access to the vehicle.

The transponder 44 includes, in a manner known per se, a circuit which, when activated by the antenna 40, is arranged to exchange signals with the latter, and in particular, to emit towards the antenna 40 (and therefore towards the identification module 36) a signal which comprises an identifying code for the user, or ID code. The module 36 then verifies that the signal received by the antenna 40 contains a valid ID code. The module 36 is arranged so that it will then deliver orders through the line 46 to the central locking module 38, but only if it has received the valid ID code.

The device for controlling opening of the door 20 also includes a button 50 for effecting the locking of the associated door lock 24, or for the simultaneous actuation of the centralised locking system for all of the locks of the vehicle. This button 50 is a manually actuated button, which, in simple terms, acts on a switch 52 which is normally open and which, when the user pushes down on it as indicated in FIG. 4, is closed so as to transmit an order to the central control unit for locking the locks, through the identification module 36.

The system shown in FIGS. 1 to 4 operates in the following way. Starting from either the locked or the unlocked state of the door locks, as in FIG. 2, an authorised user moves his hand, wearing the transponder 44, towards the door 20, and then grasps the door handle plate 22 and pivots it about its pivot axis A1 in the clockwise direction with reference to FIGS. 2 and 3.

Once he starts to lift the plate 22, this causes the switch 42 to close, and the antenna 40 to be activated, and this leads to recognition of the valid code carried by his transponder 44, and thereby activates the central unlocking module 38, which accordingly sends an unlocking command to the door locks 24. Continued outward pivoting movement of the door handle plate 22 then causes mechanical opening of the door lock 24, which has already been unlocked, to be initiated through the mechanical coupling 30. Once the lock 24 has been opened, the user releases the door handle 22, which is returned elastically towards its rest position seen in FIG. 2 by a suitable return spring (not shown in FIGS. 1 to 4).

When the user requires to lock at least one lock of the vehicle once more, or all of the locks at the same time where the vehicle has a central locking system, he moves his hand once again towards the door handle 22 as shown in FIG. 4. He then presses on the button 50 without lifting the plate 22, and this closes the switch 52. The effect of this closure of the switch 52 is to activate the antenna 40 through the identification module 36, which recognises the ID code carried by the transponder 44. If the code is valid, this then causes the various locks to be locked.

Figure 5:
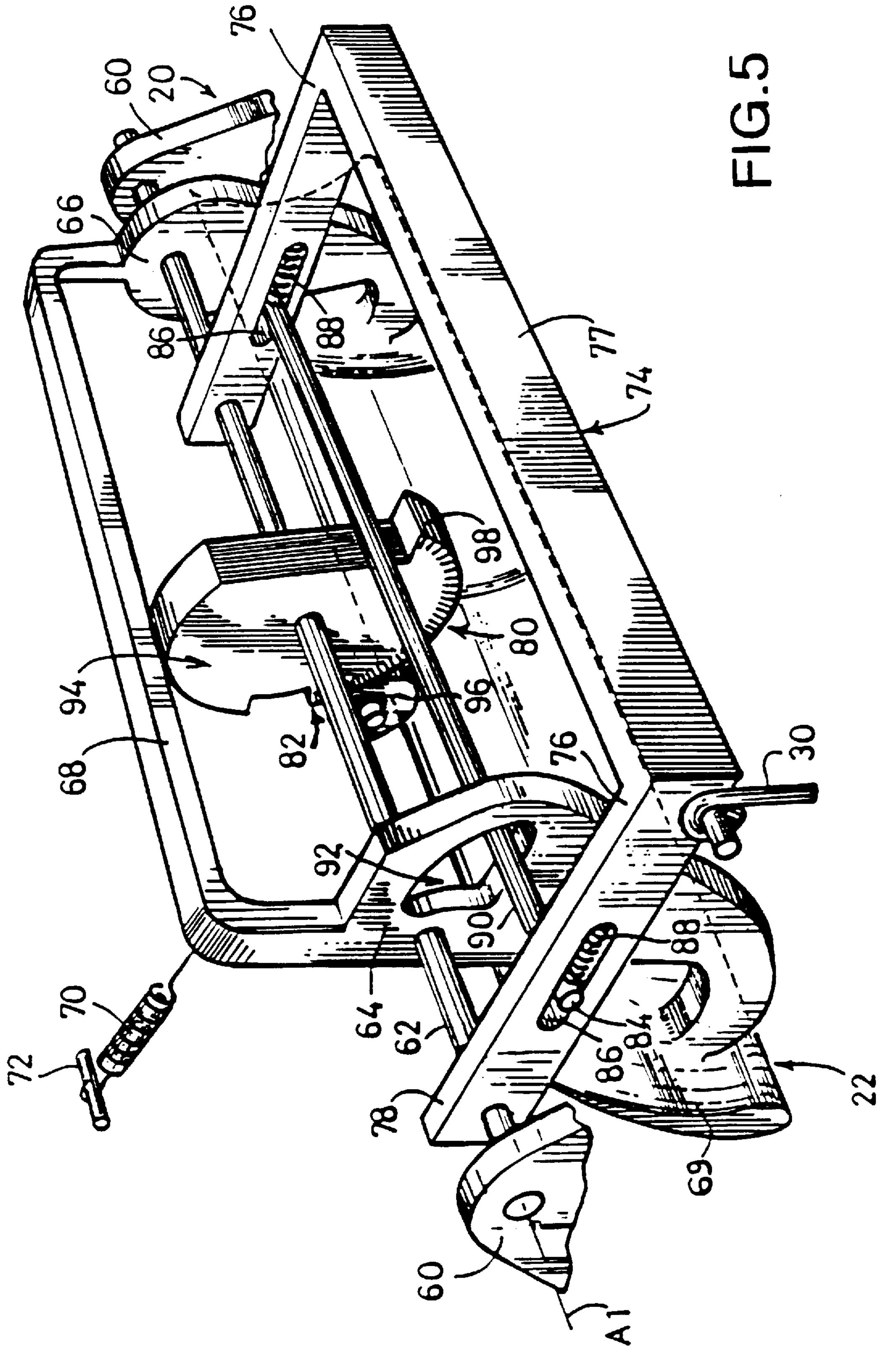
FIG. 5 is a diagrammatic perspective view showing the main mechanical components of a control device in accordance with the invention, associated with a door handle such as that shown in FIG. 1.

In the interests of optimising the ergonomics of the door control system described above, the door handle plate 22 and the mechanical control of the opening of a door lock 24 are constructed in accordance with features of the present invention, a first embodiment of which is shown in FIG. 5, to which reference will now be made.

FIG. 5 shows two fixed parts 60, which may for example be incorporated in the structure of the door 20. The door handle lifting plate 22 is mounted for pivoting movement with respect to these fixed parts 60 about the geometric axis A1, through an interposed pivot rod 62 that passes through two parallel arms 64 and 66 of the door handle 22. The two arms 64 and 66 are joined together by a horizontal connecting bar 68, and by a lower portion 69 which is part of the lifting plate of the door handle 22, so as to constitute a rigid frame. FIG. 5 also shows at 70, diagrammatically, the return spring mentioned above. The spring 70 is hooked on to fixed elements 72 of the door 20. This spring 70 resiliently biasses the door handle 22 towards its rest position, that is to say it exerts a permanent biassing force in the anti-clockwise direction with reference to FIGS. 5 to 11.

The mechanical coupling connected between the door handle 22 and the door lock 24 of the door 20 includes a link 30, FIG. 5. The door handle 22 acts on this link 30 through an intermediate lever 74, so that it does not act on the link 30 directly. The intermediate lever 74 consists essentially of two parallel arms 76 which are spaced apart longitudinally along the axis A1, like the arms 64 and 66 of the door handle 22. Each of the arms 76 is articulated in the region of its free end 78, about the geometric axis A1, through the pivot rod 62. Thus the door handle 22 and the intermediate lever 74 are mounted for rotation about the same geometric axis A1, with each of them being for example free to pivot with respect to the pivot rod 62.

The two parallel arms 76 are joined together through a transverse longitudinal arm 77, so as to constitute the intermediate lever 74, the latter being in the form of an open frame.

The mechanical coupling between the door handle 22 and the intermediate lever 74 is obtained essentially through a control bar 80 which extends in a longitudinal direction, parallel to the geometric axis A1 and therefore at right angles to the arms 64 and 66 of the door handle 22, and at right angles to the arms 76 of the intermediate lever 74, these arms being oriented radially with respect to the axis A1.

The control bar 80 is arranged to be actuated by a motorised mechanism 82 which will be described in detail later in this description. Each of the two longitudinal and opposed ends 84 of the control bar 80 is received in sliding relationship in a guide slot 86 formed through a respective one of the two arms 76 of the intermediate lever 74. The control bar 80 is therefore displaceable, in a direction at right angles to its longitudinal direction, with respect to the intermediate lever 74, in the general plane of the latter, that is to say generally in a transverse direction T which is oriented radially with respect to the geometric axis A1.

Each of the side guides or slots 86 receives for example a helical compression spring 88, which permanently biasses the control bar 80 in sliding movement within the guide slots 86, in the direction towards the axis A1, that is to say towards the pivot rod 62. The control bar 80 includes a portion 90 situated close to one of its opposed longitudinal ends 84, being on the left in FIG. 5. This portion 90 extends through a guide aperture 92 formed in the arm 64 of the door handle 22, for guiding the displacement of the control bar 80. For this purpose, the control aperture 92 lies in a plane at right angles to the pivot axis A1. The control profile of the aperture 92, with which the portion 90 of the control bar 80 cooperates, will be described in greater detail below, with reference to FIGS. 6 to 11.

The motorised mechanism 82 which actuates the control bar 80, so as to displace it with respect to the intermediate lever 74 within the guide slots 86, consists of a control cam 94 in the first embodiment shown in FIG. 5. The control bar 80 is in permanent engagement against the profile of the cam 94, being held there by the springs 88.

In this example, the control cam 94 is a rotary cam which is mounted for free rotation on the pivot rod 62, and which is therefore able to be rotated, in both directions about the geometric axis A1, by an electric motor (not shown in the drawings), the drive pinion 96 of which cooperates with a toothed sector 98 of the cam 94. The motor receives commands, for rotation in one direction or the other, which are transmitted to it by the electronic central unit 34, and more particularly by the central locking and unlocking module 38 of the latter.

The system also includes sensors (not shown in the drawings) for determining precise angular positions, and in particular angular positions of the ends of the travel of the cam 94, and these sensors are also connected to the central electronic unit 34.

Figure 6:
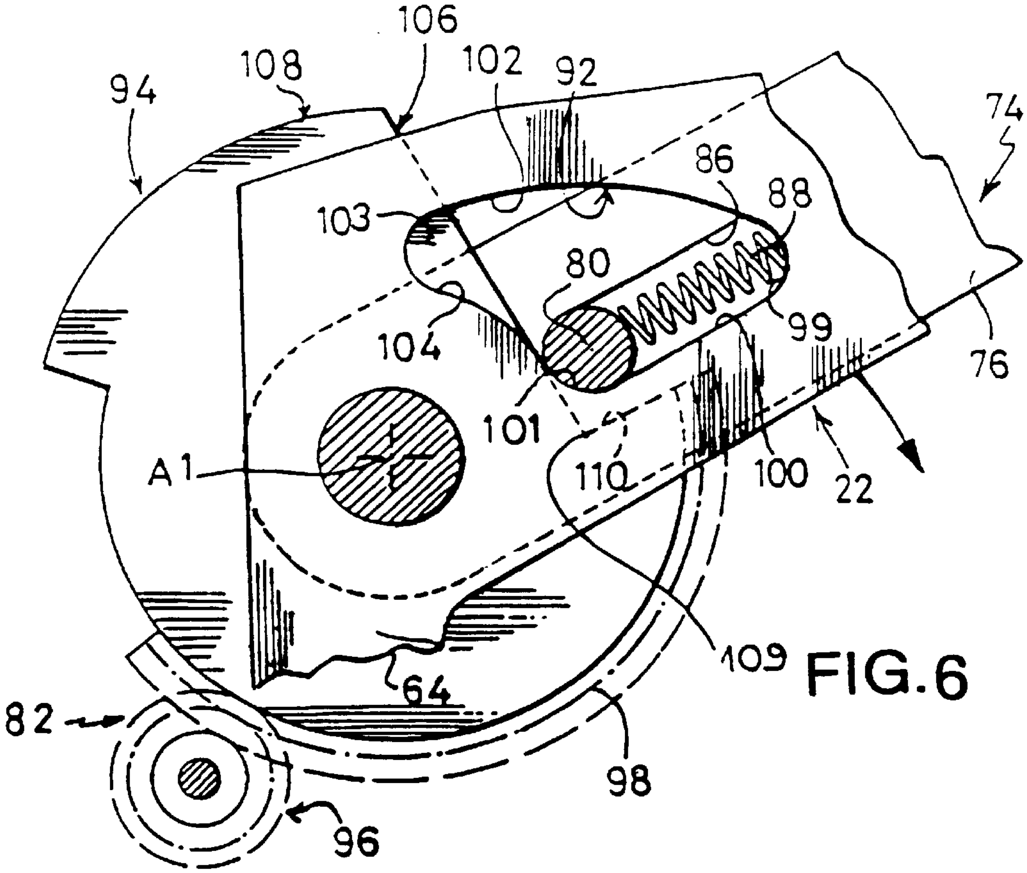
FIGS. 6 to 11 are enlarged views showing the relative positions occupied by various components of the control device shown in FIG. 5, corresponding to various phases in the use and operation of the control device.

As can be seen in particular in FIG. 6, to which reference is now made, the control aperture 92 in the arm 64 of the door handle 22 includes a substantially straight portion 100 which is oriented radially with respect to the geometric axis A1. This straight portion 100 is extended by a curved control portion 102 having a substantially circular concave profile, which is not however centred on the axis A1. The control portions 100 and 102 are joined together through a concave circular connecting portion 104, which is itself centred on the axis A1.

The active portion of the profile of the cam 94 which is arranged to cooperate with the control bar 80 consists essentially of a portion 106 with a straight profile, which is not oriented radially, that is to say the radial distance of the different points on this straight portion 106 with respect to the axis A1 increases progressively going radially towards the outside of the cam 94. This straight, or working, portion 106 of the cam 94 is extended by a convex circular portion 108 which is centred on the axis A1. At its other end 109, lying radially closest to the axis A1, the working portion 106 is extended by an abutment portion 110 which is substantially straight and which lies substantially at right angles to the straight working portion 106.

The various operating modes of this device will now be described with reference to FIGS. 6 to 11, starting with FIG. 6. FIG. 6 shows the relative angular position of the door handle 22, the intermediate lever 74 and the cam 94 when these components are in their initial or rest position corresponding to the rest position (FIG. 2) of the door handle 22 and the rest position of the cam 94.

Figure 7:
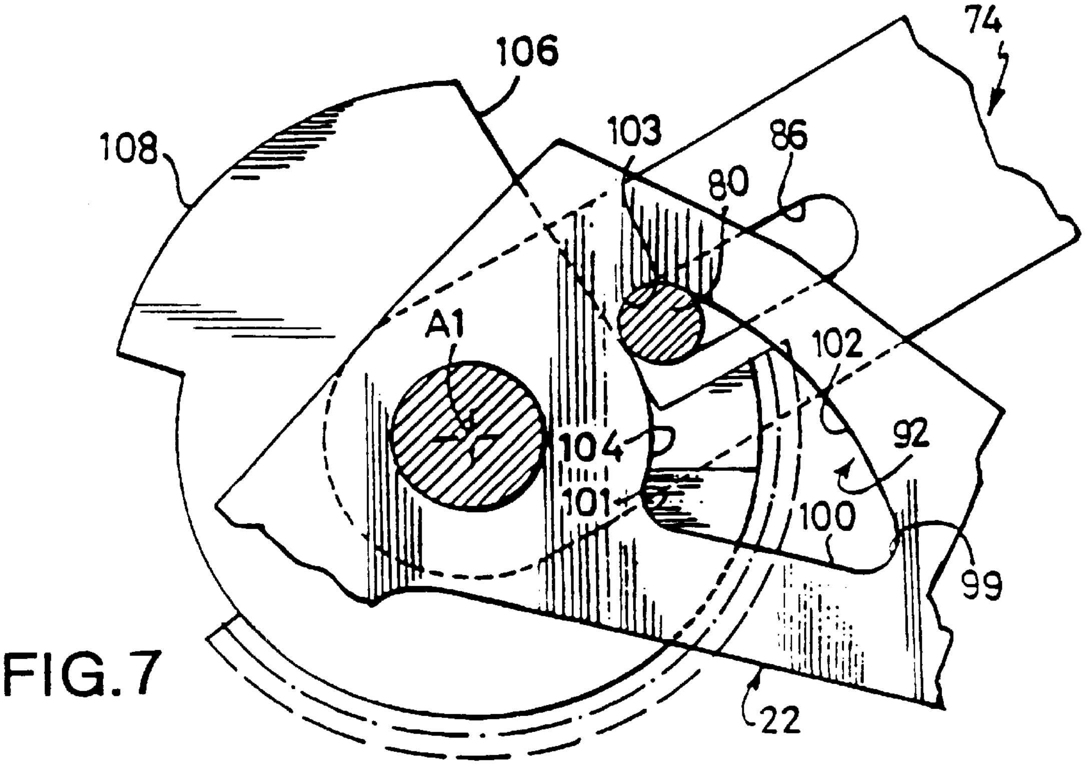

Starting from the position shown in FIG. 6, it will be supposed that an authorised user is rapidly extending his hand towards the door handle 22 which contains the antenna 40, and that, being in a hurry, he then very quickly lifts the door handle plate through a complete pivoting movement in the clockwise direction with reference to the drawings, so that the handle is moved from its rest position (FIG. 6) to its second end position which is that of mechanical opening of the door lock, this position being shown in FIG. 7.

The movement of manipulation of the door handle 22 in this example is so fast so as to be completed entirely before the electronic central unit 34 has initiated any operation of the motorised mechanism 82 whatever. During the course of the pivoting movement of the door handle plate 22 about the axis A1, the control bar 82 moves over the centred circular connecting portion 104 of the aperture 92 from its end 101 corresponding to the junction point between the portions 100 and 104, to its other end 103, which corresponds to the junction between the portions 102 and 104. This pivoting movement of the door handle 22 thus has no effect on the control bar 80, and it also has no effect on the intermediate lever 74, nor, as a consequence, on the link 30 (FIG. 5) and the rest of the mechanical coupling between the intermediate lever 74 and the door lock 24.

However, starting from the beginnning of his manipulation of the door handle, the authorised user has caused the identification module 36 to be energised and therefore also the centralised unlocking module 38 for the locks (and in particular for the lock 24 associated with the door 20). This energisation, or activation, will cause the motorised mechanism 82 to start operating. The mechanism 82 will then leave its inhibited state shown in FIGS. 6 and 7, so as progressively to reach an operational state.

Starting from the position shown in FIG. 7, and supposing the user keeps pulling on the door handle plate 22, so as to hold the latter in its open position, the motorised mechanism 82 starts to operate, and rotates the cam 94 in the clockwise direction about the axis A1. In the course of this rotation, the straight portion 106 of the cam 94 acts on the control bar 80, that is to say it tends progressively to move the latter radially away from the axis A1 in the direction T. However, the control bar 80 does not move freely across the slide guide slots 86, that is to say the control bar 80 is in simultaneous cooperation with the working portion 102 of the aperture 92 of the door handle 22. The control bar 80 proceeds to travel progressively over the control portion 102 of the aperture 92, from its end 103 that corresponds to the junction between the portion 102 and the centred circular portion 104, to its other end 99 that corresponds to its junction with the straight portion 100.

Figure 8:
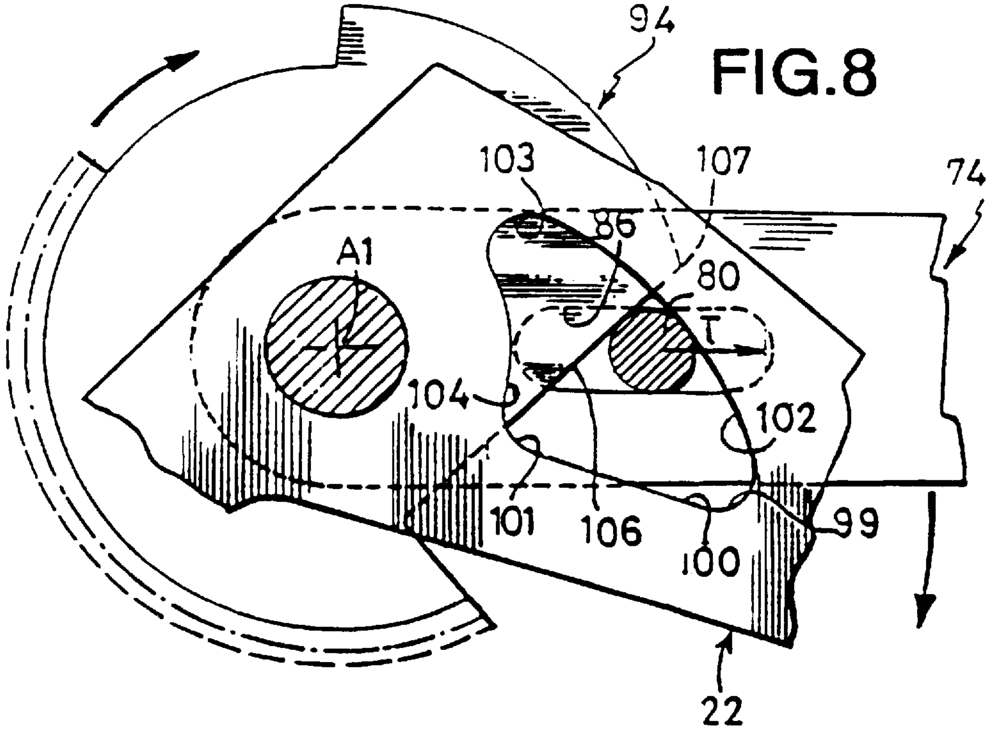

The combination of the cooperation of the control bar 80 with the working portion 106 of the cam 94 and the control portion 102 in the profile of the aperture 92 leads to rotation of the intermediate lever 74 about the axis A1 in the clockwise direction with reference to FIGS. 7 and 8. There is therefore now a direct mechanical action on the door lock 24, thus progressively causing the lock to be opened.

Figure 9:
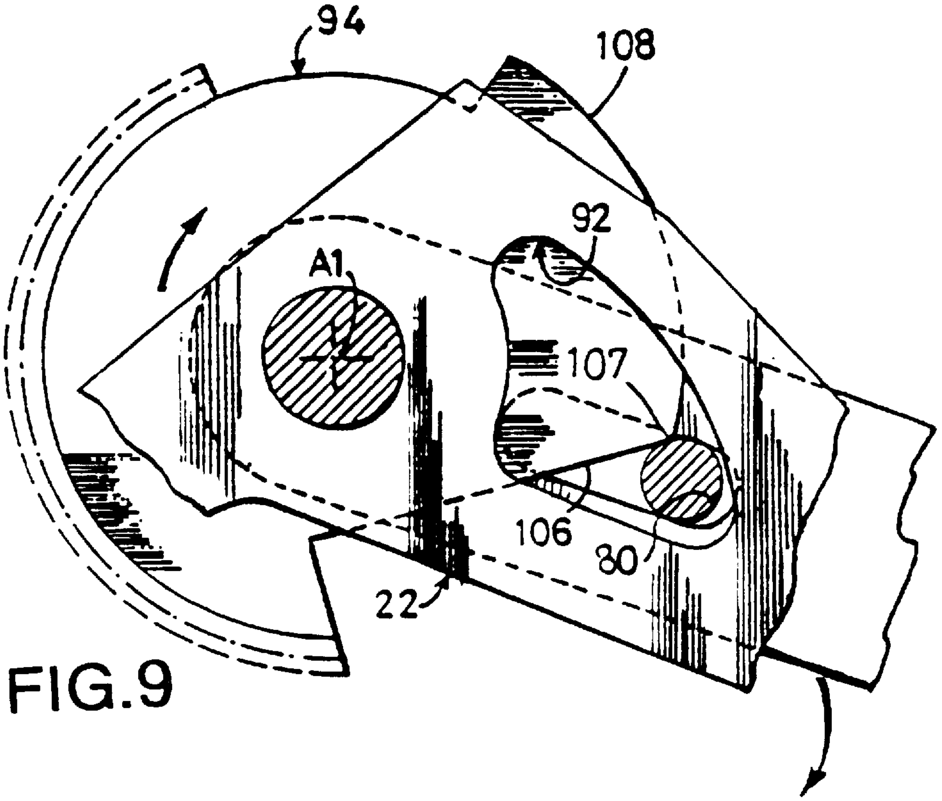

The components are shown in FIG. 8 in an intermediate position, and the different movements of the cam 94 and intermediate lever 74 are continued in the same clockwise direction of rotation, firstly to the position shown in FIG. 9, in which the bar 80 is reaching the extreme point 107 lying radially farthest towards the outside of the straight working profile 106, this extreme point 107 corresponding to the junction of the working portion 106 with the convex circular portion 108 of the cam 94.

Figure 10:
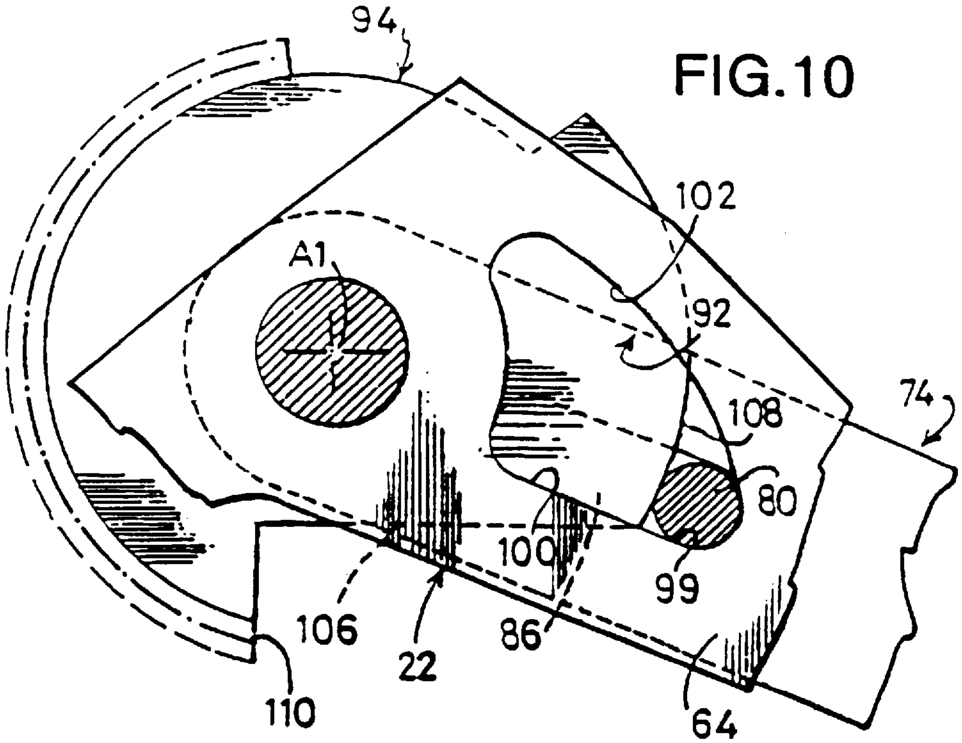

Referring now to FIG. 10, this shows the maximum angular position reached by the cam 92 at the end of its movement when driven in the direction corresponding to unlocking of the door lock, that is to say the position corresponding to the extreme operational state of rotation of the cam 94. In this position, the rotating intermediate lever 74 has reached its maximum angular position corresponding to opening of the door lock 24, while the control bar 80 is in facing relationship with the start of the convex circular portion 108 of the profile of the cam 94. The bar 80 is now also in abutment on the base of the aperture 92 corresponding to the junction point 99 between the working portions 100 and 102 of the latter.

The motorised mechanism 82 has thus caused the door lock 24 to be commanded to open in a "transparent" way, i.e. so that the authorised user can clearly see that it is open, so that he can be content in the usual way to cause the door handle 22 to pivot between its two end positions. The mechanical opening of the door lock, as such, is effected, independently of the manoeuvring force applied to the door handle 22, by the motorised mechanism 82 acting on the control bar 80, the latter itself acting on the intermediate lever 74, with the lever 74 acting on the link 30 shown in FIG. 5.

Figure 11:
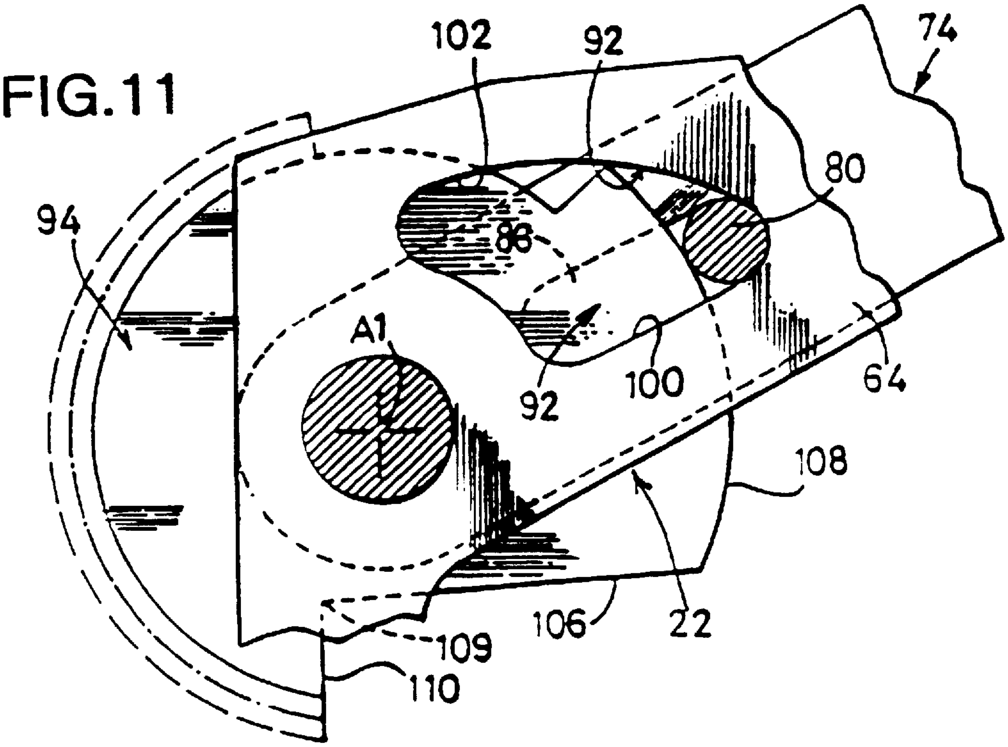

If the user releases the door handle 22, then starting from the position shown in FIG. 10, and under the action of the return spring 70, the door handle 22, with its arm 64 including the aperture 92, will pivot about the axis A1 from its second or open position shown in FIG. 10 to its first or rest position shown in FIG. 11. In the course of this pivoting motion, in the clockwise direction with reference to FIGS. 10 and 11, the straight portion 100 of the aperture 92 cooperates with the control bar 80 so as to drive the latter in simultaneous rotation in the anti-clockwise direction about the axis A1. As it is displaced in this way, the control bar 80 travels over the convex circular portion 108 of the cam 94; and since the latter is centred on the axis A1, the cam 94, which is then fixed in rotation, does not in any way interfere with the displacements of the control bar 80.

By contrast, the bar 80, which is trapped between the parallel faces of the slots 86, simultaneously drives the intermediate lever 74 in rotation in the anti-clockwise direction to the rest position shown in FIG. 11, which corresponds, for the latter, to its original rest position seen in FIGS. 6 and 7. Thus, release of the door handle 22 by the user has led to a fresh command for the mechanical closing of the door lock 24.

In the position shown in FIG. 11, the door handle 22 is in its rest position, while the motorised mechanism 82, including the cam 94, is in its operational state, that is to say any fresh action on the door handle 22 by any user whatever, that is to say whether the user is authorised or not, leads to mechanical opening of the door lock which has been unlocked beforehand. In this connection, a fresh pivoting action in the clockwise direction of the door handle 22 about the axis A1 causes the intermediate lever 74 to be driven in rotation in the clockwise direction by the control bar 80, on which the curved concave working portion 102 of the aperture 92 accordingly acts so as to drive the control bar 80 in rotation in the clockwise direction about the axis A1, with the control bar 80 once more travelling over the convex, centred circular portion 108 of the fixed cam 94.

If an authorised user wants to lock the vehicle using the central locking system once more, he presses on the control button 50. This action on the button 50, after the user has been identified, causes the motorised control device 82 to be activated, so that the control cam 94 is thereby rotated afresh in the anti-clockwise direction starting from the operational state shown in FIG. 11. During this anti-clockwise rotation, the cam 94 does not act on the intermediate lever 74, which remains in the position shown in FIG. 11.

In this connection, during the first return phase of the cam 94 towards the state of inhibition of the motorised mechanism 82, the control bar 80 travels over the convex, centred circular profile 108 of the cam 94, and then it simultaneously travels over the working portion 106 of the cam 94, towards the point 109 at which the portions 106 and 110 of the cam are joined, and the radially oriented straight portion 100 of the aperture 92.

The displacements of the control bar 80 along the radially oriented straight portion 100 result in a displacement of the bar 80 radially inwardly towards the axis A1, but they have no action on the manoeuvring lever 74 because the bar 80 slides in the radially oriented slide guide slots 86. At the end of its anti-clockwise rotation, the cam 94 and the other components are once more in their angular relative positions shown in FIG. 6.

Now starting from FIG. 6 again, it will be supposed that the authorised user pulls on the door handle 22 by a sufficient amount to operate the switch 42, and enough to lead to recognition of the identification code by the identification module 36; however, it will also be supposed that he then immediately releases the door handle 22, that is to say without waiting for the motorised device 82 to start operating, and without waiting for the door lock 24 to be opened mechanically.

The door handle 22 will then remain, after being released, in its first or rest position shown in FIG. 6, while the cam 94, under the action of the central locking module 38 which has been activated by the identification module 36, will be driven in rotation in the clockwise direction, so that the motorised mechanism 82 leaves its inhibited state shown in FIG. 6 and goes into its operational state shown in FIG. 11. During this clockwise rotation of the cam 94, the latter, through its straight portion 106, causes the control bar 80 to be displaced radially outwardly away from the axis A1 in the direction T, along the radially oriented straight portion 100 of the aperture 92, from the end 101 to the end 99, that is to say the cam 94 causes only sliding movement of the bar 80 in the slide guide slots 86. This movement has no action on the intermediate lever 74.

Rotation of the cam 94 is continued until the angular position shown in FIG. 11 is reached, in which the motorised mechanism 82 is stopped in its operational state, that is to say in a state in which it enables the opening of the door lock to be effected mechanically by simple manoeuvring of the door handle 22, in the manner explained above with reference to FIG. 11.

The device according to the invention, for example as described above, thus enables total viability of the various modes of manipulation of the door handle 22 to be obtained, with a view to opening the door lock 24 of the door 20.

The straight portion 110 of the cam 94 constitutes an abutment which resists any improper actuation of the door lock mechanism, that is to say it resists any direct action which may be taken on the mechanical linkage or on the intermediate lever 74, with a view to causing the latter to pivot in the clockwise direction from its rest position shown in FIG. 6 in which the cam is in its inhibited state. In this connection, the system is such that any attempt to rotate the intermediate lever 74 would result in the control bar 80 being driven in rotation in the clockwise direction about the axis A1, so that it then comes into abutment against the straight portion 110 of the cam 94. The cam 94 is prevented from rotating in its inhibited state by the motorised mechanism 82, since the latter is itself stopped.

Figure 12:
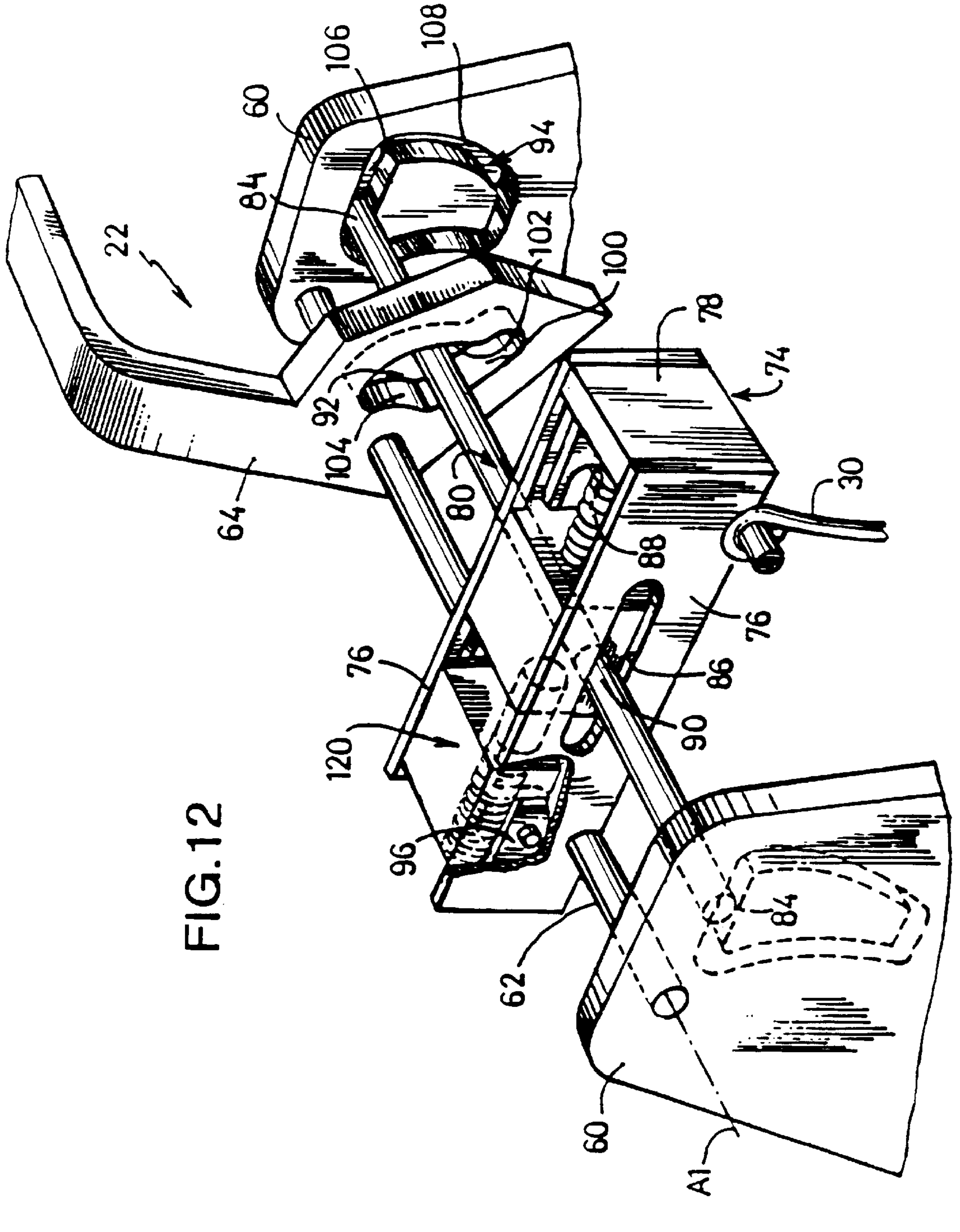
FIG. 12 is a diagrammatic perspective view, corresponding to FIG. 5 but showing a second embodiment of the control device in accordance with the invention.

Reference will now be made to FIG. 12, showing a second embodiment of the invention. This embodiment differs from the first embodiment shown in FIG. 5 in the structure of the motorised mechanism which controls the displacements of the control bar 80.

The drive pinion 96 of the motorised mechanism works, in this example, on a linear actuator which consists of a worm and wormwheel system 120 carried by the intermediate lever 74. The system 120 causes displacements of the bar 80 in sliding movement in the slide guides 86 formed in the arm 76 of the intermediate lever 74. In this case it is the central portion 90 of the bar 80 that is received in sliding movement in the slide guide slots 86, while its opposed longitudinal ends 84 are each received in a respective one of two cams 94. Each cam 94 is here made in the form of a hollow groove formed in a fixed riser element 60 of the door 20.

The association of a linear actuator 120 carried by the intermediate arm 74 with a double cam 94 in the form of fixed grooves is a mechanical equivalent of the rotating and motorised cam 94 shown in FIG. 5, and the general method of operation of the device shown in FIG. 12 is identical to that described above with reference to FIGS. 5 to 11.

What is claimed is:

1. A motor vehicle door opening apparatus comprising: a door defining at least one fixed pivot axis; a lock carried by the door; and a manually operable door handle mounted on the door for pivoting displacement about said pivot axis between a first, rest, position and a second, fully open, position, the fully open position corresponding to unlocking of said lock; and a lock actuating linkage connected to the lock, wherein the apparatus further includes an intermediate lever carried by the door for pivoting displacement of the intermediate lever about said fixed pivot axis and connected to said lock actuating linkage; a controllable motorised mechanism interposed operatively between the door handle and the intermediate lever, said motorised mechanism comprising a control member and means coupled to said control member for displacing said control member between an inhibited first state of said mechanism, in which manipulation of the door handle is ineffective on the intermediate lever; and an operational second state in which manipulation of the door handle causes simultaneous displacement of the intermediate lever, said mechanism being adapted to cause the intermediate lever to be displaced until said lock is unlocked when the mechanism is actuated to displace the mechanism from said inhibited first state to said operational second state.

2. The apparatus according to claim 1, wherein the intermediate lever is mounted for pivoting movement about said pivot axis as the door handle.

3. The apparatus according to claim 2, wherein said mechanism further includes a control bar, the intermediate lever including means mounting the control bar for linear sliding movement with respect to the intermediate lever, in a direction substantially at right angles to the orientation of the control bar and generally radial with respect to said fixed pivot axis, the door handle defining a control profile, the control bar cooperating with said control profile, and said mechanism further including a motorised member engaging the control bar for controlling displacements of the control bar in said linear sliding movement.

4. The apparatus according to claim 3, wherein the door handle defines a plane at right angles to said fixed pivot axis, the door handle having a control aperture in said plane, the control bar including a portion extending through said control aperture, the control aperture including a portion of its internal contour which constitutes said control profile cooperating with said portion of the control bar.

5. The apparatus according to claim 4, wherein said control profile comprises a substantially straight, radially oriented, portion, a curved portion, and a circular junction portion centered on said fixed pivot axis and joining said straight and curved portions together.

6. The apparatus according to claim 3, wherein said controllable mechanism includes a control cam, and biassing means engaging the control bar and biassing the control bar in a linear direction into permanent cooperation with the profile of the control cam.

7. The apparatus according to claim 6, wherein the control cam is mounted for rotation about said fixed pivot axis of the door handle, said controllable mechanism further including an actuating motor coupled to the control cam for driving the control cam in rotation independently of the door handle.

8. The apparatus according to claim 7, wherein the profile of the control cam includes a straight portion defining an increasing radial distance from said fixed pivot axis along the length of said straight portion, said straight portion of the cam profile engaging the control bar for urging the control bar in linear movement in a direction corresponding to a shift of said mechanism from said inhibited first state to said operational second state.

9. The apparatus according to claim 8, wherein the profile of the control cam further includes a portion of constant radius joined to said straight portion thereto at the point of greatest radial distance of said straight portion from said fixed pivot axis, the control bar being adapted to traverse said portion of constant radius when the door handle reverts from its said second position to its said first position.

10. The apparatus according to claim 6, wherein the control cam is fixed, said controllable mechanism comprising a linear actuator carried by the intermediate lever for acting directly on the control bar.

11. The apparatus according to claim 3, further including means for blocking rotation of the intermediate lever when said controllable mechanism is in said inhibited first state, said blocking means comprising means for blocking displacement of the motorised member.

12. The apparatus according to claim 1, further including means for blocking rotation of the intermediate lever when said controllable mechanism is in said inhibited first state.

13. The apparatus according to claim 1, further including resilient means for biassing the door handle towards said first rest position.

14. The apparatus according to claim 1, further including an electronic central unit for generating orders for locking and unlocking of at least one said lock of a vehicle and for governing said controllable mechanism, said central unit comprising an identification module for identification of an authorised user of the vehicle, said identification module including an antenna, the apparatus further including a portable transponder for use by said authorised user, the identification module being adapted for exchange of signals between the antenna and said transponder and to emit an excitation signal through the antenna, the transponder being arranged to emit an identification signal automatically in response to said excitation signal.

15. The apparatus according to claim 14, wherein the antenna is incorporated in the door handle.

16. The apparatus according to claim 14, wherein the identification module further includes a switch connected to the door handle so as to be operable by the door handle when the latter leaves said first rest position, whereby to activate the antenna.

17. The apparatus according to claim 14, wherein said central unit includes at least one manually operable switch for controlling locking of said at least one lock.

* * * * *